(12) United States Patent
Furukawa

(10) Patent No.: US 8,447,253 B2
(45) Date of Patent: May 21, 2013

(54) RADIO COMMUNICATION SYSTEM

(75) Inventor: Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 11/819,410

(22) Filed: Jun. 27, 2007

(65) Prior Publication Data

US 2007/0254693 A1 Nov. 1, 2007

Related U.S. Application Data

(63) Continuation of application No. PCT/JP2005/000057, filed on Jan. 6, 2005.

(51) Int. Cl.
*H03J 7/18* (2006.01)

(52) U.S. Cl.
USPC ............ 455/168.1; 455/450; 455/452.1; 455/509; 375/260; 375/335; 370/203; 370/208; 370/210

(58) Field of Classification Search
USPC ............ 455/126, 500, 450, 452.1, 168.1, 455/509; 370/204, 208, 203, 210; 375/133, 375/149, 260, 335
See application file for complete search history.

(56) References Cited

U.S. PATENT DOCUMENTS

| | | | | |
|---|---|---|---|---|
| 5,381,449 A | * | 1/1995 | Jasper et al. | 375/298 |
| 5,802,241 A | * | 9/1998 | Oshima | 386/328 |
| 5,818,813 A | * | 10/1998 | Saito et al. | 370/208 |
| 6,134,262 A | * | 10/2000 | Kitade et al. | 375/142 |
| 6,347,220 B1 | | 2/2002 | Tanaka et al. | |
| 6,609,010 B1 | | 8/2003 | Dolle et al. | |
| 6,985,460 B2 | | 1/2006 | Sugaya et al. | |
| 7,085,535 B2 | | 8/2006 | Goto et al. | |
| 7,274,652 B1 | * | 9/2007 | Webster et al. | 370/204 |
| 7,313,174 B2 | * | 12/2007 | Alard et al. | 375/149 |
| 7,609,775 B2 | * | 10/2009 | Kimura et al. | 375/260 |

(Continued)

FOREIGN PATENT DOCUMENTS

| | | |
|---|---|---|
| CN | 1432245 | 7/2003 |
| GB | 2391137 A * | 1/2004 |

(Continued)

OTHER PUBLICATIONS

The State Intellectual Property Office of China, First Notification of Office Action for corresponding Chinese Patent Application No. 200580045260.X, dated Jan. 29, 2010. English translation attached.

(Continued)

*Primary Examiner* — Junpeng Chen
(74) *Attorney, Agent, or Firm* — Myers Wolin, LLC

(57) ABSTRACT

In a radio communication system in which multiple bands or a plurality of different radio frequencies are used, a different radio transmission method is used in each band or at each radio frequency. For example, by transmitting data using radio formats which are different in each band or at each radio frequency, the radio transmission method is made different in each band or at each radio frequency. In order to vary the radio format, (1) the pilot length is varied at each radio frequency; or (2) the pilot interval is varied at each radio frequency; or (3) the guard interval length is varied in each band or at each radio frequency; or (4) when multicarrier modulation is used for radio communication in each band, the subcarrier interval for multicarrier transmission is varied in each band.

3 Claims, 9 Drawing Sheets

U.S. PATENT DOCUMENTS

| | | | | |
|---|---|---|---|---|
| 7,746,938 | B2* | 6/2010 | Hasegawa et al. | 375/260 |
| 2004/0047284 | A1* | 3/2004 | Eidson | 370/203 |
| 2004/0116083 | A1* | 6/2004 | Suzuki et al. | 455/126 |
| 2004/0248608 | A1 | 12/2004 | Kobayashi | |
| 2005/0249266 | A1* | 11/2005 | Brown et al. | 375/133 |
| 2006/0211426 | A1* | 9/2006 | Costa et al. | 455/450 |
| 2007/0159957 | A1* | 7/2007 | Ljung et al. | 370/208 |
| 2007/0297382 | A1 | 12/2007 | Webster et al. | |

FOREIGN PATENT DOCUMENTS

| | | |
|---|---|---|
| JP | 9-135230 A | 5/1997 |
| JP | 9-233075 | 9/1997 |
| JP | 11-266228 | 9/1999 |
| JP | 2000-216753 A | 8/2000 |
| JP | 2000-224247 | 8/2000 |
| JP | 2001-136146 A | 5/2001 |
| JP | 2001-189951 A | 7/2001 |
| JP | 2002-064458 | 2/2002 |
| JP | 2002-300172 A | 10/2002 |
| JP | 2003-158499 | 5/2003 |
| JP | 2003-158499 A | 5/2003 |
| JP | 2003-264528 A | 9/2003 |
| JP | 2004-140648 A | 5/2004 |
| WO | 00/24168 | 4/2000 |
| WO | 01/82543 | 11/2001 |
| WO | 01/95579 | 12/2001 |

OTHER PUBLICATIONS

Japanese Patent Office "Interrogation" issued for corresponding Japanese Patent Application No. 2006-550557, dated Apr. 15, 2011. English translation attached.

The State Intellectual Property Office of China, First Notification of Office Action with Text of the First Office Action attached, issued for corresponding Chinese Patent Application No. 201010248699.5, issued Jul. 4, 2011. English translations attached.

2nd Notification of Office Action issued for corresponding Chinese Patent Application No. 201010248699.5 issued Jul. 2, 2012 with English translation.

Notification of Reson for Refusal issued for corresponding Japanese Patent Application No. 2010-001281 dispatched Apr. 10, 2012 with English translation.

Decision of Refusal issued for corresponding Japanese Application No. 2001-001281, dispatched Sep. 18, 2012, with partial English translation.

Behringer, L. V.; "GSM and DECT Dual-Mode-Handys" with English translation; Funkschau, Weka Fachzeitschriften Verlag, Poing, De, vol. 3, No. 3; Jan. 1, 1996. [Corresponds to document cited in European Search Report dated Nov. 13, 2012.].

Aston, P.S.; "Satellite Telephony for Fixed and Mobile Applications"; Aerospace Conference Proceedings, IEEE, vol. 11; Feb. 1, 2000. [Corresponds to document cited in European Search Report dated Nov. 13, 2012.].

Hewitt, T.; "Report on the IMT-2000 results at WRC-2000"; 3rd Generation Partnership Project; Technical Specification Group Services and System Aspects; Tsgs#8(00)316; Meeting #8, Dusseldorf, Germany; Jun. 26-28, 2000.

Hanzo, L. et al.; "OFDM and MC-CDMA for Broadband Multi-User Communications, WLANS and Broadcasting"; Jun. 30, 2004. [Corresponds to document cited in European Search Report dated Nov. 13, 2012.].

Supplementary European search report issued for corresponding European Patent Application No. 05709214.0, dated Nov. 13, 2012.

Decision of Rejection issued for corresponding Chinese Patent Application No. 201010248699.5, issued Dec. 4, 2012, with English translation.

* cited by examiner

RADIO COMMUNICATION SYSTEM

This application is a continuation application based on International application No. PCT/JP2005/000057, filed on Jan. 6, 2005, the entire contents of which are incorporated herein by reference.

BACKGROUND OF THE INVENTION

The present invention relates to a radio communication system which uses multiple bands or a plurality of different radio frequencies, and in particular relates to a radio communication system, and a transmission apparatus and reception apparatus, which use different radio transmission methods (radio transmission parameters) for each band or radio frequency.

Second-generation mobile telephone systems use a plurality of frequency bands, such as the 800 MHz band and the 1.5 GHz band. And, in the IMT-2000 third-generation mobile telephone system, currently the 2 GHz band is being used, but usage of the 800 MHz band in the near future is also being studied. Thus the use of a plurality of frequency bands in a single mobile telephone system is a well-known fact.

In a multiple-band radio communication system, that is, a radio communication system using a plurality of bandwidths (bands), or in a multi-carrier radio communication system using a plurality of different radio frequencies, in the prior art the same radio parameters which are synonyms of the radio formats were used for all. That is, the radio format comprises, for example, (1) the length of interpolated pilots necessary for channel estimation, (2) the length of the guard interval GI to prevent intersymbol interference, and (3) the number of subcarriers in multi-carrier transmission and the interval between subcarriers; in the prior art, these radio parameters (formats) were the same regardless of the radio frequency or band. However, if the frequency band used is different, then propagation characteristics are different, and so reception performance is accordingly different. FIG. 15 explains multi-band transmission; in order to simplify the explanation, the frequency bands are limited to the 1 GHz band and the 2 GHz band, but there is no need to limit the bands to these frequency bands, nor is there a need to limit transmission to two bands.

(1) Radio Transmission System with Pilot Interpolation

In a radio transmission system in which the 1 GHz and 2 GHz frequency bands are used, even when the motion velocity is the same, one fading velocity is twice the other due to the frequency bands used. Hence if the pilots of the same length are interpolated for channel estimation, the channel estimation precision will be different for 1 GHz and for 2 GHz, and reception performance will be poorer in the 2 GHz band compared with the 1 GHz band. However, in the prior art, as shown in FIG. 16, the lengths of the pilots PL1, PL2 interpolated into the data DT1, DT2 regardless of frequency band are the same, and so there has been the problem that the channel estimation precision is worsened for the 2 GHz band.

FIG. 17 shows the configuration of such a transmission apparatus of the prior art, in which the pilot length is held constant regardless of the frequency band; FIG. 18 shows the configuration of a reception apparatus.

In the transmission apparatus, the modulation portion $1a$ performs for example QPSK modulation of the transmission data, the pilot insertion portion $1b$ inserts pilot signals PL into the QPSK in-phase component and quadrature component, the 1 GHz transmitter $1c$ up-converts the frequency of signals with pilots PL to 1 GHz and transmits the signals, and the 2 GHz transmitter $1d$ up-converts the frequency of the signals with pilots PL inserted to 2 GHz and transmits the signals. Pilot insertion may be performed before QPSK modulation.

In the reception apparatus, the 1 GHz receiver $2a$ down-converts received 1 GHz high-frequency signals to baseband signals and inputs the signals to the selection portion $2c$, and the 2 GHz receiver $2b$ down-converts received 2 GHz high-frequency signals to baseband signals and inputs the signals to the selection portion $2c$. The selection portion $2c$ selects baseband signals output from the receiver indicated by a 1 GHz/2 GHz selection signal SEL output from a control portion, not shown, and inputs these signals to the pilot extraction portion $2d$ and demodulation portion $2e$. The pilot extraction portion $2d$ extracts pilots from the input signals, and the channel estimation portion $2f$ uses the extracted pilot signals and known pilot signals to estimate the channel (path propagation characteristics). The demodulation portion $2e$ performs channel compensation of data signals based on the channel estimation value, and then demodulates the transmission data.

In this way, the transmission apparatus inserts pilot signals of the same length for both 1 GHz/2 GHz, and uses the same radio format to transmit the radio signals. Hence when demodulating data transmitted at 2 GHz, the channel estimation precision is worsened, and so high-precision data demodulation is not possible.

(2) Radio Transmission System with Guard Intervals Inserted

In a radio transmission system in which guard intervals GI are inserted in order to prevent intersymbol interference, the necessary guard interval length differs depending on the positional relation between the base station and the mobile station. For example, propagation losses differ at 1 GHz and at 2 GHz, and it is known that signals reach farther at 1 GHz, and the delay spread is longer in the 1 GHz band. The guard interval length is generally determined according to the longest delay spread. That is, when the guard interval length is the same (same radio format) for each band, the positional relation between base station and mobile station for which the delay spread is longest is assumed to determine the required guard interval length. FIG. 19 is an example of a radio format of the prior art; the length of 1 GHz/2 GHz guard intervals GI is determined based on 1 GHz delay spreading. From the above, in the 2 GHz band the guard intervals are too long, that is, there is the problem that transmission efficiency is worsened by providing excess guard interval length.

FIG. 20 is an example of a transmission apparatus in a radio transmission system in which guard intervals GIs are the same; FIG. 21 shows the configuration of a reception apparatus, in an example of multicarrier transmission by Orthogonal Frequency Division Multiplexing (OFDM), in which data is transmitted from a transmitter with guard intervals of the same length inserted at 1 GHz/2 GHz.

In the transmission apparatus, the serial/parallel conversion portion $3a_1$ of the multicarrier modulation portion $3a$ converts the transmission data into N parallel data symbols, the IFFT portion $3a_2$ performs IFFT processing of the parallel data symbols into N subcarrier components, and the parallel/serial conversion portion $3a_3$ converts the N-symbol IFFT processing result into serial data, which is output. The guard interval addition portion $3b$ adds a guard interval of constant length, set in advance, to the beginning of N-symbols, the 1 GHz transmitter $3c$ up-converts the frequency of the signals with guard intervals inserted to 1 GHz and transmits the signals, and the 2 GHz transmitter $3d$ up-converts the frequency of the signals with guard intervals inserted to 2 GHz and transmits the signals.

In the receiver, the 1 GHs receiver 4a down-converts the 1 GHz high-frequency received signals to baseband signals and inputs the signals to the selection portion 4c, and the 2 GHz receiver 4b similarly down-converts 2 GHz high-frequency received signals to baseband signals and inputs the signals to the selection portion 4c. The selection portion 4c selects baseband signals output from the receiver indicated by a 1 GHz/2 GHz selection signal SEL output from a control portion, not shown, and inputs these signals to the guard interval removal portion 4d. The guard interval removal portion 4d removes guard intervals from the input signals, and inputs the result to the FFT portion 4e. The FFT portion 4e parallel-converts the input signals into N-symbols, then performs N-point FFT processing, serial-converts the FFT result, and inputs this to the demodulation portion 4f. The demodulation portion 4f demodulates the transmission data from the input signals.

In this way, the transmitter inserts guard intervals of the same length, and uses the same radio format for transmission of radio signals at both 1 GHz/2 GHz. As a result, the guard intervals are too long at 2 GHz, and transmission efficiency is worsened.

(3) Multicarrier Transmission System Using Multiple Bands

As shown in FIG. 22, in radio communication systems which perform multicarrier transmission by the OFDM method in each of multiple bands (the 1 GHz band and 2 GHz band), when frequency fluctuations due to fading occur, the orthogonality between adjacent subcarriers is degraded. The degree of degradation of orthogonality differs with the frequency band used. That is, even when the motion velocity is the same, in the 2 GHz band the amount of frequency fluctuation is twice that in the 1 GHz band, and so the amount of degradation is greater than in the 1 GHz band.

In OFDM, transmission signals are serial/parallel-converted (converted into N parallel signals), the signal rate is lowered, and the N transmission signals are each allocated to a subcarrier and transmitted. The subcarrier interval or band width is determined by the signal rate (=1/T Hz) after serial/parallel conversion. Subcarrier intervals are set to 1/2T intervals so that subcarriers are orthogonal on the frequency axis. In this OFDM transmission method, as explained above, there is frequency fluctuation due to multipath fading, and when the orthogonality between subcarriers is degraded, performance deteriorates. Hence there is a need to set the frequency intervals in advance taking this fluctuation into account, so that degradation in a band does not occur. However, In multiple-band radio transmission systems of the prior art, subcarrier intervals in a band are the same at 1 GHz and at 2 GHz. A radio communication system performing multicarrier transmission using OFDM in multiple bands (the 1 GHz band and 2 GHz band) has the same configuration as in FIG. 20 and FIG. 21.

There exists technology in which, when the degree of signal degradation differs with the frequency, signals for a frequency channel with a satisfactory reception state are selectively received (JP 2002-64458A). In this technology of the prior art, in a multi-frequency network in which a plurality of transmitting stations transmit the same content at different frequencies, a receiving station detects the reception levels of signals sent over two channels with different frequencies, and uses the signals in the channel with the higher reception level for content restoration.

Also, there exists technology in which a frequency, time, or direction for which radio communication interference is anticipated is determined, and radio communication is performed avoiding these conditions (JP 2002-300172A).

However, these technologies of the prior art do not improve the reception performance in each band or at each frequency in a multiple-band radio communication system or in a multicarrier radio communication system.

SUMMARY OF THE INVENTION

In light of the above, an object of the invention is, in a multiple-band radio communication system and a multicarrier radio communication system, to improve the reception performance, and moreover the transmission efficiency, in each band or at each frequency.

A further object of the invention is to improve the channel estimation precision and improve the reception performance at each frequency, and enhance transmission efficiency, by changing the lengths of pilots inserted at each frequency.

A further object of the invention is to reduce intersymbol interference and improve reception performance in each band or at each frequency, and enhance transmission efficiency, by changing the lengths of guard intervals inserted in each band or at each frequency.

A further object of the invention is to reduce the effect of frequency fluctuations and improve reception performance in each band, and enhance transmission efficiency, by using different numbers of subcarriers in multicarrier transmission, or different subcarrier intervals, in each band.

This invention relates to a radio communication system which uses multiple bands or a plurality of different radio frequencies (for example, two non-continuous bands, two separated bands, two radio frequencies belonging to different frequency bands, or similar); in this radio communication system, different radio transmission parameters (transmission methods) are used in each of the bands or at each of the radio frequencies. That is, by transmitting data using different radio parameters (radio formats) in each band or at each radio frequency, the radio transmission methods are made different in each band or at each radio frequency.

Here, even in a case where data is transmitted using different radio parameters for each band for only two bands among a plurality of bands, it can be interpreted that a communication system uses different radio transmission parameters for each of two used bands. Of course, different radio transmission parameters can be used for all of the bands used as well.

Further, when parameters are made different, it is preferable that the parameters be made different in common for radio communication apparatuses (radio transmission apparatuses and radio reception apparatuses) which use same band. For example, radio communication apparatuses which communicate using a first band, uniformly use the first parameter applied to the first band, and radio communication apparatuses which communicate using a second band, uniformly use the second parameters applied to the second band.

When a radio communication apparatus is instructed, by external input or similar, to use a first band or a second band, it is desirable that the parameters corresponding to the respective bands be read from a storage portion, and that a control portion execute control of various portions according to the read-out parameters.

Of course, when one radio communication apparatus accommodates only a single band, it is desirable that other radio communication apparatuses use a different band and that parameters compatible with the first band and parameters compatible with the second band respectively be used. In this case, it is again desirable that radio parameters corresponding to each band be stored in a storage portion, in order that each radio communication apparatus can accommodate any band, and that the control portion read radio parameters according to a specified band and execute control.

Further, when using three different bands, which are first, second, and third bands (assuming that the frequency interval between the second band and third band is greater than the frequency interval between the first band and second band), the same radio parameters can be used in the first and second bands, and different radio parameters can be used in the third bands. By this means, portions in which problems arising due to different frequencies appear prominently can be targeted and addressed and the problem can be removed.

Further, it is preferable that radio communication apparatuses using a first band and a second band be a single radio communication apparatus (radio base station), but may be different radio communication apparatuses.

When different radio communication apparatuses use both the first and second bands, it is desirable that the apparatuses belong to the same communication carrier, or adopt the same radio communication method (for example OFDM) other than parameters described below, or belong to the same radio communication system (for example a fourth-generation mobile communication system), or have a common core network.

Of course, if the radio parameters described below are made different, then the first band may belong to a first communication carrier and the second band to a second communication carrier.

Further, for the radio communication apparatuses using a first band and a second band, it is desirable that the same coding method, decoding method, and modulation/demodulation method be adopted, but that in radio segments the radio format for transmission and reception (for example, the formats described below) be made different. A first specific method in which radio parameters (radio formats) are made different is a method in which pilot lengths are made different in each band or at each radio frequency. By this means, the channel estimation precision at each frequency can be improved, and reception performance and transmission efficiency can be enhanced.

A second specific method in which radio parameters (radio formats) are made different is a method in which pilot intervals are made different in each band or at each radio frequency. By this means, the channel estimation precision is improved at each frequency, and reception performance and transmission efficiency can be enhanced.

A third specific method in which radio parameters (radio formats) are made different is a method in which guard interval lengths are made different in each band or at each radio frequency. By this means, intersymbol interference is reduced at each frequency, and reception performance and transmission efficiency can be enhanced.

A fourth specific method in which radio parameters (radio formats) are made different is a method in which, when multicarrier modulation is used for radio communication in each band, the number of subcarriers of multicarrier transmission are made different, or the subcarrier intervals are made different, in each band. By this means, the effect of frequency fluctuations in each band is reduced, and reception performance and transmission efficiency can be enhanced.

DESCRIPTION OF THE PREFERRED EMBODIMENTS (A) Summary of the Invention

A principle of the invention is making the radio parameters (radio formats) used in each band of a plurality of bands, or at each frequency in multicarrier transmission, compatible with the frequency band.

Of course, as explained in the disclosure of the invention, there is no need to make such parameters compatible for all bands used; it is sufficient to make parameters compatible with at least two bands.

However, it is desirable that radio parameters be made compatible with all of the bands used.

Figure 1:
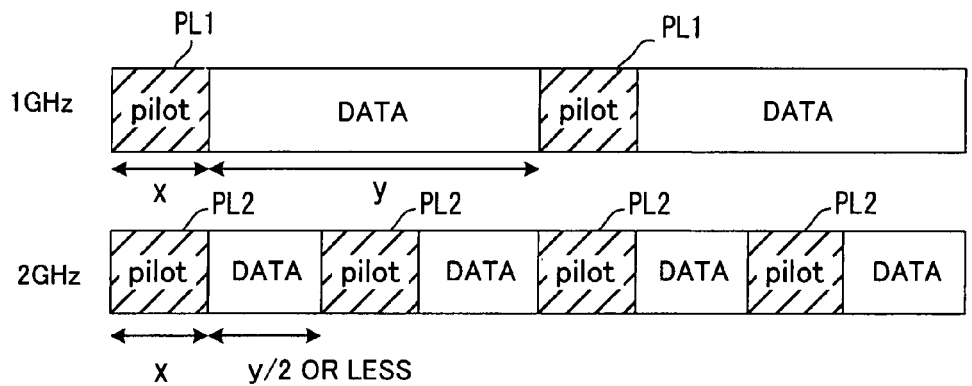
FIG. 1 is a first drawing explaining the principle of a first embodiment in which pilot lengths are made different at each radio frequency, in a radio communication system using a plurality of different radio frequencies.

A first method for making the radio parameters compatible with the frequency bands, in a radio communication system where a plurality of bands (for example, two separated bands, non-continuous bands, and similar) or a plurality of different radio frequencies (for example, two radio frequencies belonging to different bands, or similar) are used, is to make pilot lengths different in each band or at each radio frequency. By this means, the channel estimation precision is improved and reception performance can be improved in each band or at each frequency. In order to make pilot lengths different, as shown in FIG. 1, the insertion interval of interpolation pilots PL2 in the 2 GHz band is made y/2, as opposed to an insertion interval of y for interpolation pilots PL1 in the 1 GHz band. When estimating the propagation path, interpolation pilots are used, and when the insertion interval is made dense, the precision of estimation can be raised.

Figure 2:
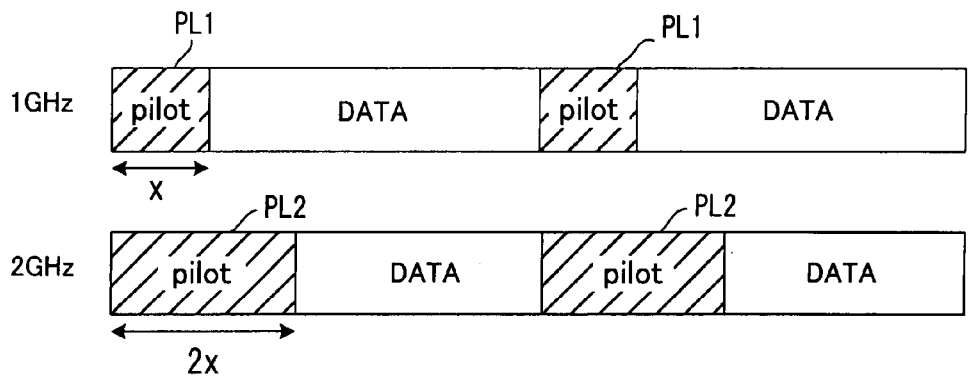
FIG. 2 is a second drawing explaining the principle of the first embodiment in which pilot lengths are made different at each radio frequency, in a radio communication system using a plurality of different radio frequencies.

Another method of making pilot lengths different is to make the interpolation pilot length in the 2 GHz band twice the interpolation pilot length x in the 1 GHz band, as shown in FIG. 2. By this means, similarly to the case of FIG. 1, the estimation precision can be raised.

Figure 3:
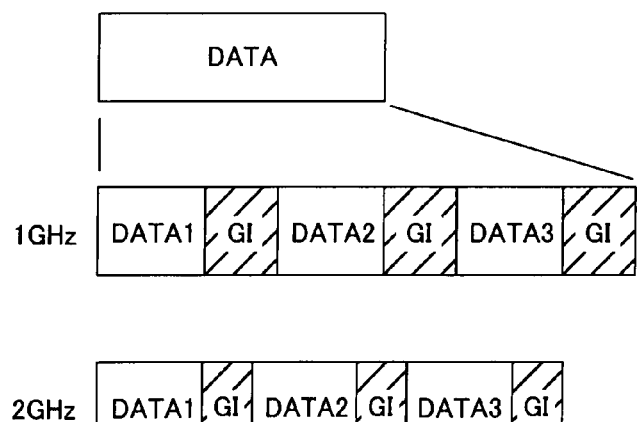
FIG. 3 is a drawing explaining the principle of a second embodiment in which guard interval lengths are made different in each band or at each radio frequency.

A second method for making the radio parameters compatible with the frequency bands is to make the guard interval lengths different in each band or at each radio frequency. By this means, intersymbol interference can be reduced, and reception performance improved, in each band or at each frequency. That is, as shown in FIG. 3, guard interval lengths are prepared which are different in each band or at each frequency, and the shortest guard interval length is allocated to the highest-frequency band (2 GHz), while the longest guard interval length is allocated to the lowest-frequency band (1 GHz). This is because the higher the frequency, the shorter is the propagation distance, so that delay spread is also shorter. By using a radio parameter with a short guard interval length for a mobile station in a position in which the delay spread is short, transmission efficiency can be improved.

Figure 4:
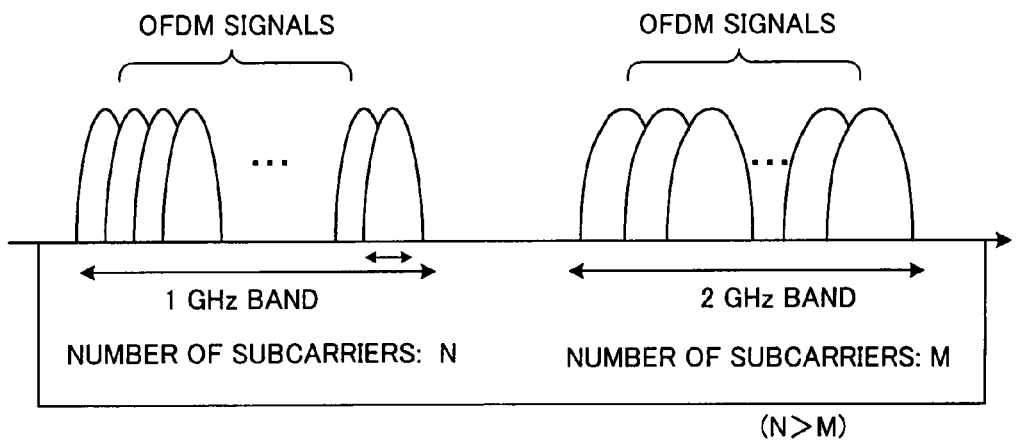
FIG. 4 is a drawing explaining the principle of a third embodiment in which, when multicarrier modulation is used in radio communication in each band, the number of subcarriers in multicarrier transmission is made different, or the subcarrier interval is made different, in each band.

A third method for making the radio parameters compatible with the frequency bands is, when using multicarrier modulation for radio communication in each band, to make the number of subcarriers in multicarrier transmission different in each band, or to make the subcarrier intervals different. By this means, the effect of frequency fluctuations in each band can be reduced, reception performance can be improved, and transmission efficiency can be enhanced. That is, as shown in FIG. 4, by making the number of subcarriers M in the 2 GHz band smaller than the number of subcarriers N in the 1 GHz band (M<N), subcarrier intervals in the 2 GHz band are larger than in the 1 GHz band. By this means, the effect of frequency fluctuations in each band can be reduced, reception performance is improved, and transmission frequency can be enhanced.

Figure 5:
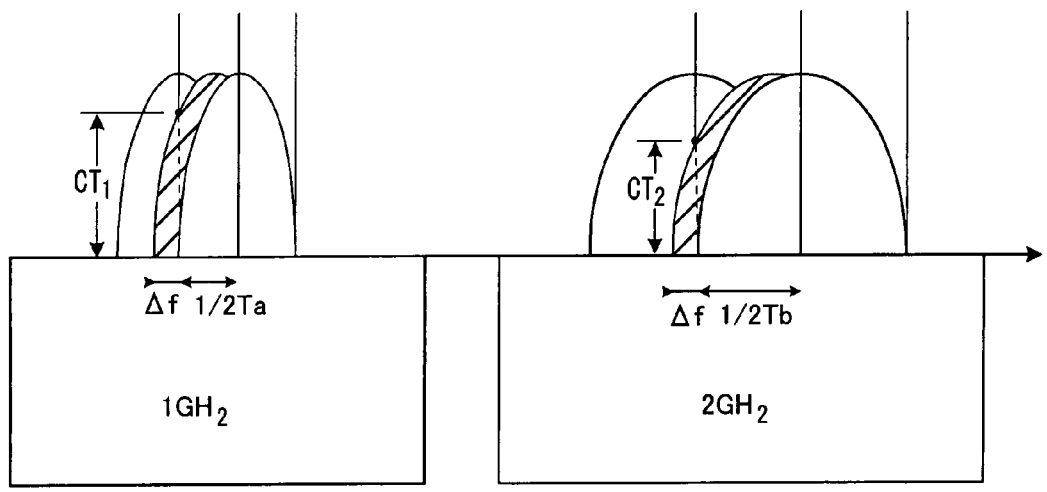
FIG. 5 explains the fact that by increasing subcarrier intervals, the effect of frequency fluctuations can be reduced.

FIG. 5 explains the fact that by increasing the subcarrier interval, the effect due to frequency fluctuations can be reduced.

The subcarrier interval $1/2T_a$ for N symbols in the 1 GHz band is:

$$1/2T_a = 1/N$$

The subcarrier interval $1/2T_b$ for M symbols in the 2 GHz band is:

$$1/2T_b = 1/M$$

Because N>M, as shown in the figure, the subcarrier interval $1/2T_b$ in the 2 GHz band is larger than the subcarrier interval $1/2T_a$ in the 1 GHz band. Here, taking into consideration a case in which frequency fluctuation over a frequency $\Delta f$ occurs, by reason of broadening the subcarrier interval, the leakage $CT_2$ with respect to the adjacent frequency in the 2 GHz band is smaller than the leakage $CT_1$ with respect to the adjacent frequency in the 1 GHz band, and the effect of frequency fluctuations can be reduced.

(B) First Embodiment

Figure 6:
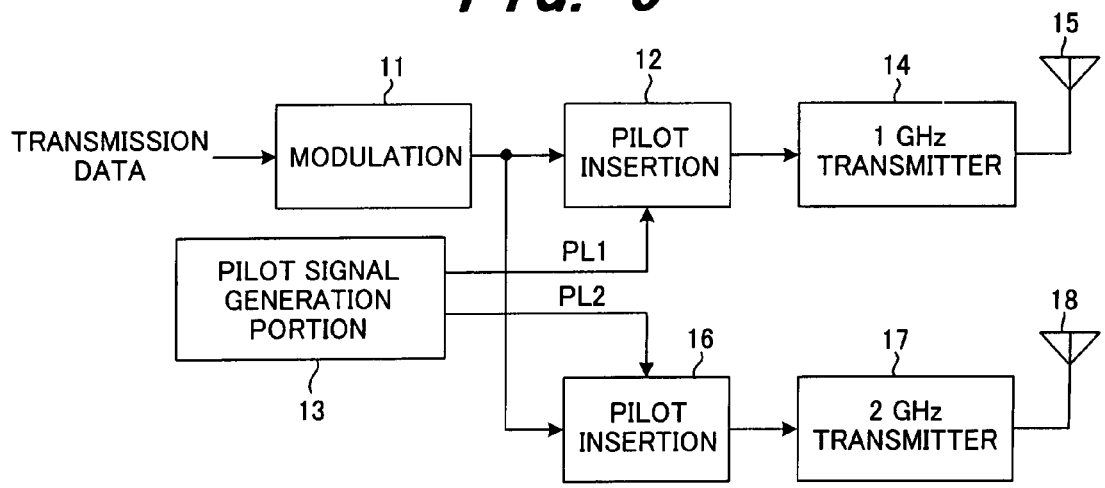
FIG. 6 shows the configuration of a transmission apparatus in the first embodiment, in which the pilot length is made different at each radio frequency in a radio communication system using a plurality of different radio frequencies.
Figure 7:
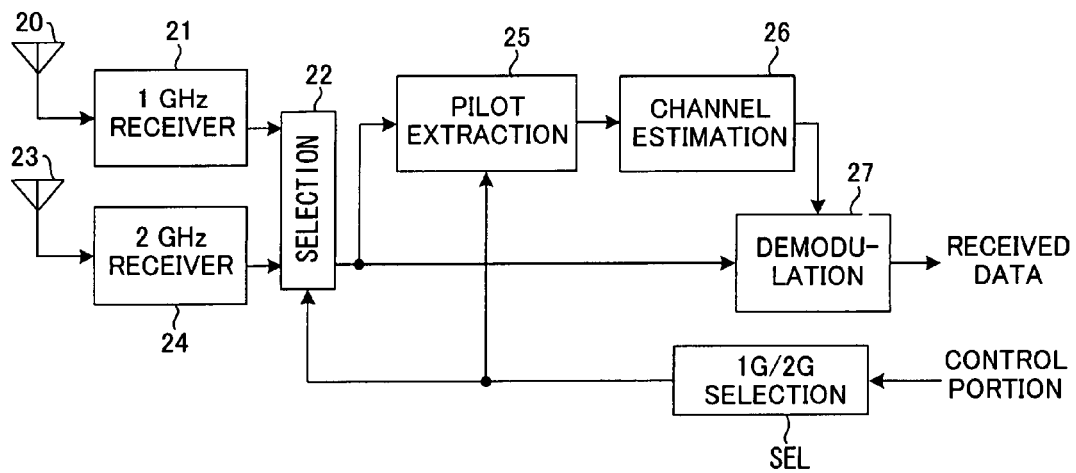
FIG. 7 shows the configuration of a reception apparatus in the first embodiment.

FIG. 6 shows the configuration of the transmission apparatus of a first embodiment, in a radio communication system using a plurality of different radio frequencies, in which pilot lengths are made different for each radio frequency; FIG. 7 shows the configuration of a reception apparatus.

In the transmission apparatus, the modulation portion 11 performs for example QPSK modulation of the transmission data, the first pilot insertion portion 12 inserts pilot signals PL1 for 1 GHz (see FIG. 1 and FIG. 2) generated by the pilot generation portion 13 into the QPSK in-phase component and quadrature component, and the 1 GHz transmitter 14 up-converts the frequency of the signals with the pilots PL1 inserted to 1 GHz and transmits the signals from the antenna 15. The second pilot insertion portion 16 inserts pilot signals PL2 for 2 GHz (see FIG. 1 and FIG. 2) generated by the pilot generation portion 13 into the QPSK in-phase component and quadrature component, and the 2 GHz transmitter 17 up-converts the frequency of the signals with the pilots PL2 inserted to 2 GHz and transmits the signals from the antenna 18.

In the reception apparatus, the 1 GHz receiver 21 down-converts 1 GHz high-frequency signals received by the antenna 20 to baseband signals and inputs the signals to the selection portion 22, and the 2 GHz receiver 24 down-converts 2 GHz high-frequency signals received by the antenna 23 to baseband signals and inputs the signals to the selection portion 22. The selection portion 22 selects the baseband signals output from the receiver indicated by a 1 GHz/2 GHz selection signal SEL output from a control portion, not shown, and inputs the selected signals to the pilot extraction portion 25 and demodulation portion 27. The pilot extraction portion 25 extracts pilots (complex signals) from the input signals based on the 1 GHz/2 GHz selection signal SEL, and inputs the averaging result to the channel estimation portion 26. The channel estimation portion 26 uses the input pilot signals and known pilot signals to estimate the channel (path propagation characteristics). The demodulation portion 27 performs channel compensation of data signals based on the channel estimation value, and then demodulates the transmission data.

Figure 8:
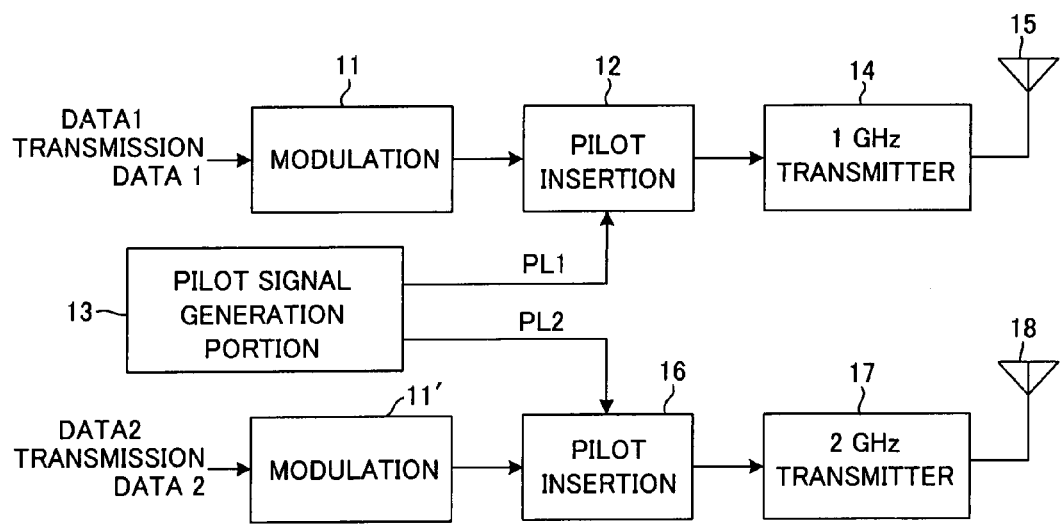
FIG. 8 shows another configuration of a reception apparatus in the first embodiment.

In the case of FIG. 6, 1 GHz/2 GHz pilots PL1, PL2 are inserted into the same transmission data and transmitted from the 1 GHz transmitter 14 and 2 GHz transmitter 17, respectively; but as shown in FIG. 8, separate transmission data 1, 2 can be modulated separately by modulators 11, 11', 1 GHz/2 GHz pilots PL1, PL2 inserted into the modulation results, and the signals transmitted by the 1 GHz transmitter 14 and 2 GHz transmitter 17 respectively. In this case, pilot insertion can be performed before modulation. Further, the above are cases in which the pilot length is changed with each radio frequency, but a configuration is also possible in which the pilot length is changed for each band.

By means of the first embodiment, the pilot length or pilot interval is made different in each band or at each radio frequency, so that the channel estimation precision can be improved and reception performance improved in each band or at each frequency, and transmission efficiency can be enhanced.

(C) Second Embodiment

Figure 9:
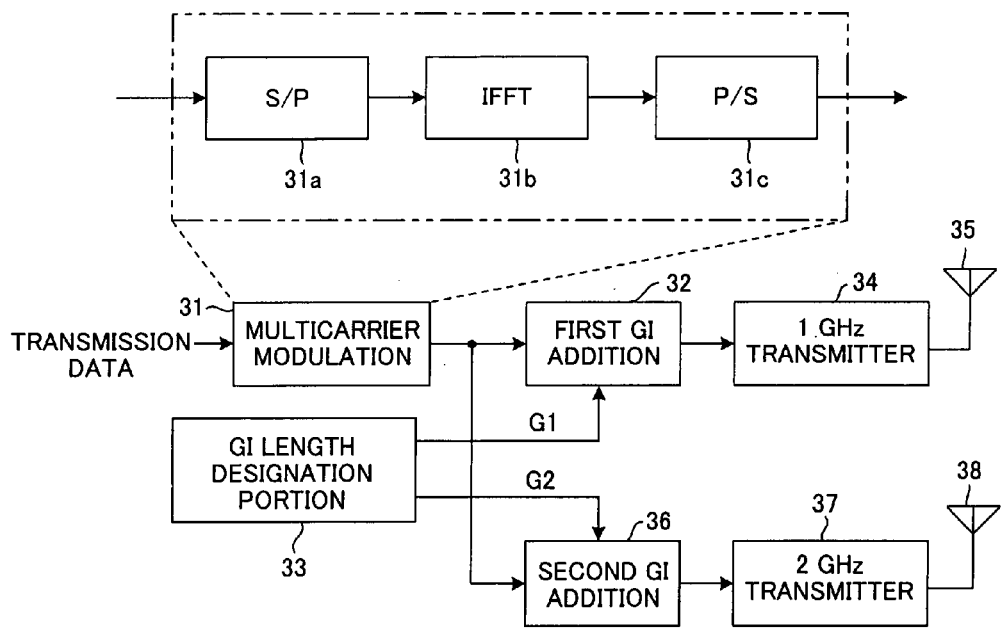
FIG. 9 shows the configuration of a transmission apparatus in the second embodiment, in which the guard interval length is made different in each band, in a radio communication system which performs OFDM transmission in each of a plurality of bands.
Figure 10:
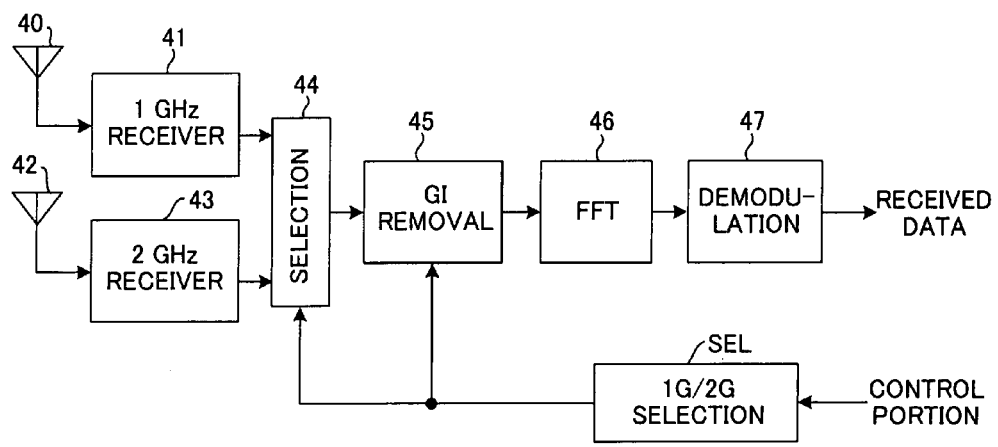
FIG. 10 shows the configuration of a reception apparatus in the second embodiment.

FIG. 9 shows the configuration of the transmission apparatus in a second embodiment in which guard interval lengths are made different in each band, in a radio communication system in which OFDM transmission is performed in each of a plurality of bands; FIG. 10 shows the configuration of a reception apparatus.

In the transmission apparatus, the serial/parallel conversion portion 31a of the multicarrier modulation portion 31 performs parallel conversion into N-symbols of the transmission data, the IFFT portion 31b performs IFFT processing as N subcarrier components of each of the parallel data symbols, and the parallel/serial conversion portion 31c converts the N-symbols of IFFT processing results (OFDM symbols) into series data as a OFDM symbol, which is output. The first guard interval addition portion 32 adds a guard interval (see FIG. 3) of the length for 1 GHz designated by the GI length designation portion 33 to the N-symbols (OFDM symbol), and the 1 GHz transmitter 34 up-converts the frequency of the signals with guard interval inserted to 1 GHz and transmits the signals from the antenna 35. The second guard interval addition portion 36 adds a guard interval (see FIG. 3) of the length for 2 GHz designated by the GI length designation portion 33 to the N symbols (OFDM symbols) from the beginning, and the 2 GHz transmitter 37 up-converts the frequency of the signals with guard interval inserted to 2 GHz and transmits the signals from the antenna 38.

In the receiver, the 1 GHz receiver 41 down-converts the 1 GHz high-frequency received signals received by the antenna 40 to baseband signals, which are input to the selection portion 44, and the 2 GHz receiver 43 down-converts the 2 GHz high-frequency received signals received by the antenna 42 to baseband signals, which are input to the selection portion 44. The selection portion 44 selects the baseband signals output from the receiver indicated by a 1 GHz/2 GHz selection signal SEL from a control portion, not shown, and inputs the signals to the guard interval removal portion 45. The guard interval removal portion 45 removes the 1 GHz or 2 GHz guard intervals from the input signals according to the 1 GHz/2 GHz selection signal SEL, and inputs the result to the FFT portion 46. The FFT portion 46 performs parallel conversion into N-symbols of the input signals, then performs N-point FFT processing, performs serial conversion of the FFT result, and inputs the result to the demodulation portion 47. The demodulation portion 47 demodulates the transmission data from the input signals.

Figure 11:
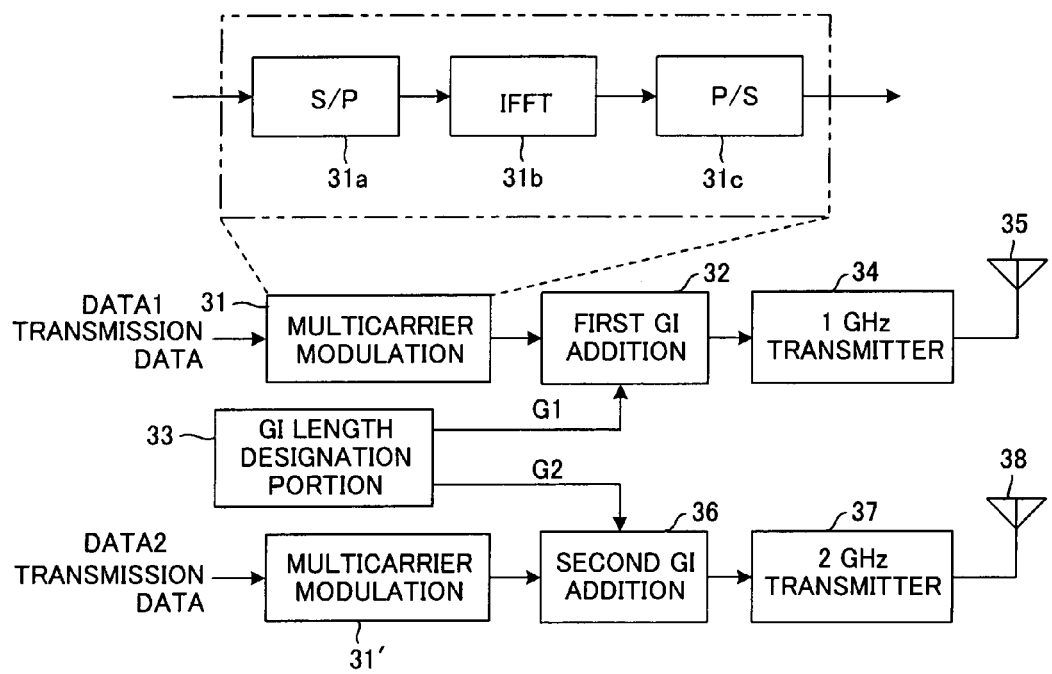
FIG. 11 shows another configuration of a transmission apparatus in the second embodiment.

In the case of FIG. 9, 1 GHz/2 GHz guard intervals G1, G2 are inserted into the same OFDM symbols and transmitted by the 1 GHz transmitter 34 and the 2 GHz transmitter 37; but as shown in FIG. 11, a configuration is possible in which multicarrier modulation of separate transmission data 1, 2 is performed by multicarrier modulators 31, 31', 1 GHz/2 GHz guard intervals are respectively inserted into the OFDM symbols that are the modulation results, and the data is transmitted by the 1 GHz transmitter 34 and 2 GHz transmitter 37.

Figure 12:
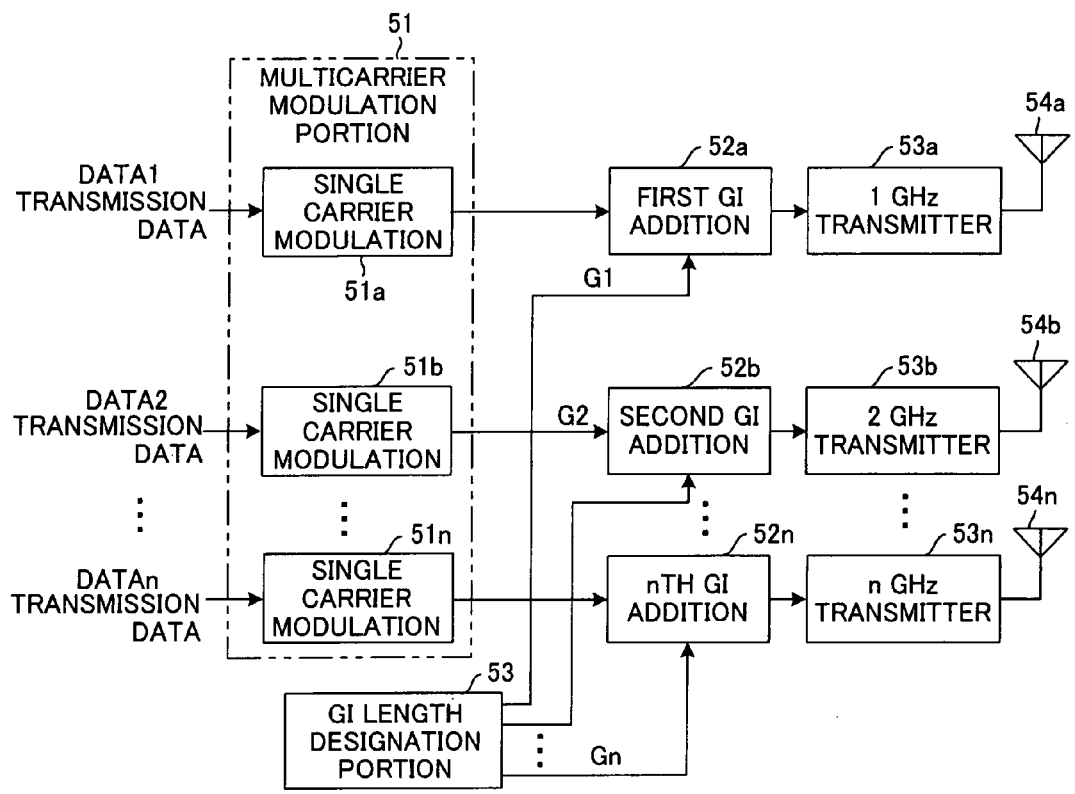
FIG. 12 shows still another configuration of a transmission apparatus in the second embodiment.

The above are cases in which guard interval lengths are changed in each of a plurality of bands; but guard interval lengths can also be changed at each carrier frequency in multicarrier transmission. FIG. 12 shows the configuration of a transmission apparatus in such a multicarrier transmission system, in which guard interval lengths are changed at each frequency. Each of the single-carrier modulation portions 51a to 51n provided on the multicarrier modulation portion 51 performs prescribed modulation (for example QPSK modulation) of transmission data DATA1 to DATAn, the first to nth guard interval addition portions 52a to 52n insert guard intervals G1 to Gn with prescribed lengths into the respective N modulated data symbols, based on the guard interval lengths designated by the GI length designation portion 53, and the first to nth transmitters 53a to 53n transmit the data, with the guard intervals inserted, from the antennas 54a to 54n.

By means of the above second embodiment, by changing the lengths of inserted guard intervals in each band or at each frequency, intersymbol interference is reduced and reception performance improved in each band or at each frequency, and transmission efficiency can be enhanced.

(D) Third Embodiment

Figure 13:
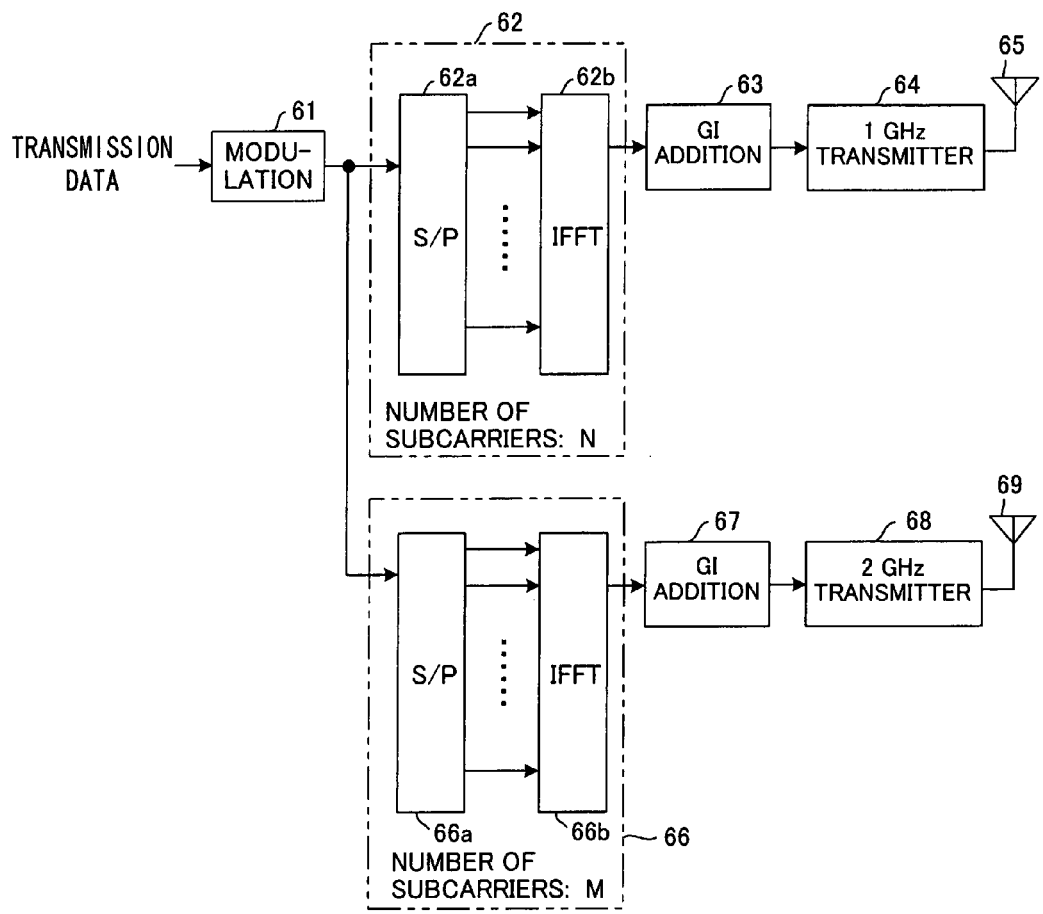
FIG. 13 shows the configuration of a transmission apparatus in a third embodiment, in which the number of subcarriers is made different and the subcarrier interval is made different in each band, in a radio communication system performing OFDM transmission in each of a plurality of bands.
Figure 14:
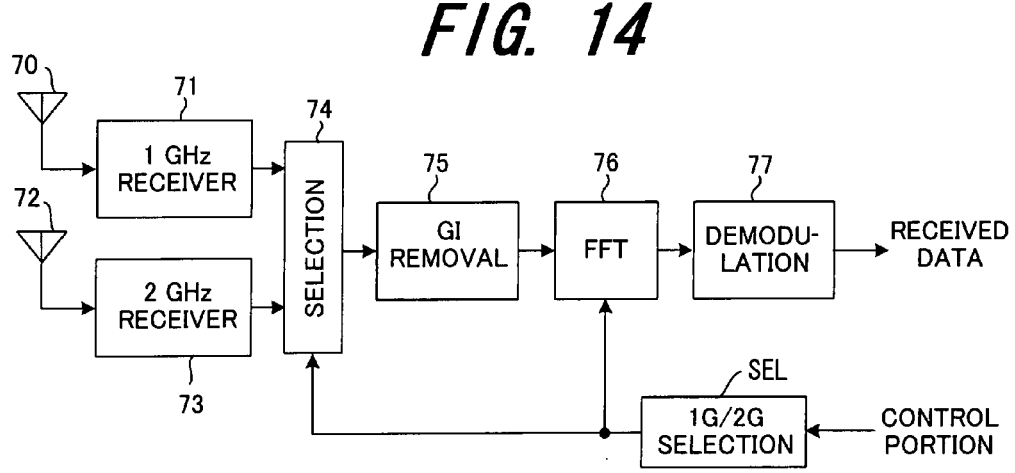
FIG. 14 shows the configuration of a reception apparatus in the third embodiment.
Figure 15:
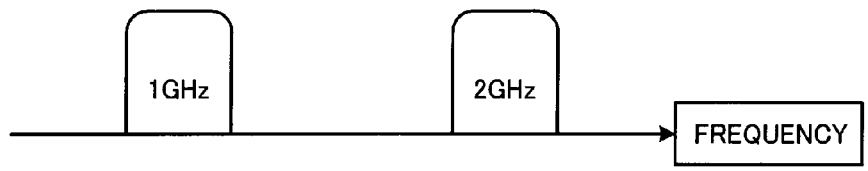
FIG. 15 explains multiple-band transmission.
Figure 16:
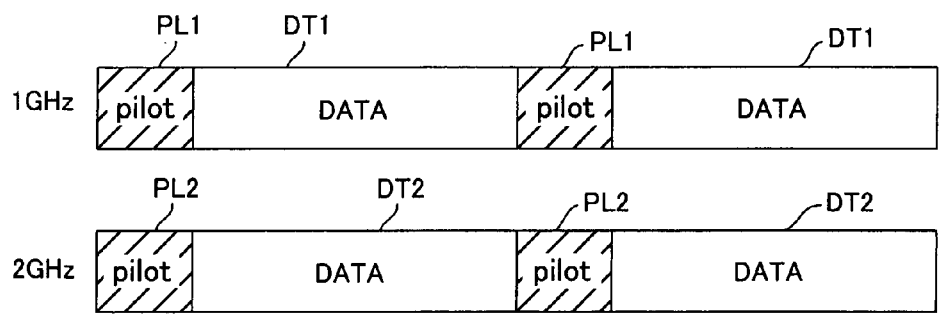
FIG. 16 explains an example of the prior art, in which the lengths of pilots PL1, PL2 inserted into data are made the same length regardless of the frequency band.
Figure 17:
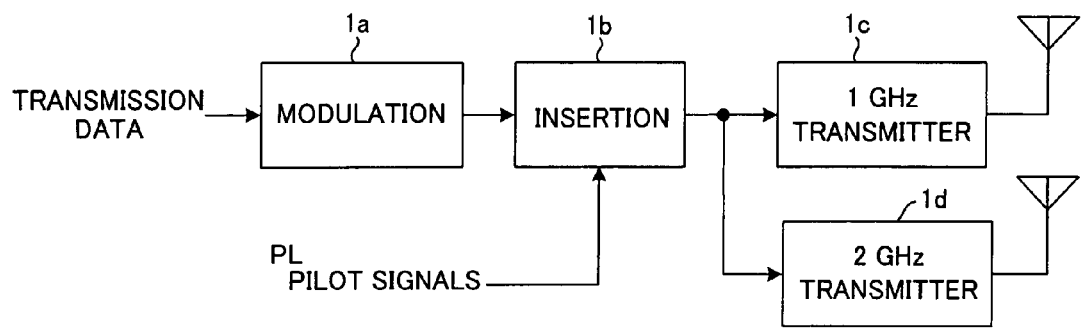
FIG. 17 shows the configuration of a transmission apparatus when pilot lengths are held constant regardless of the frequency band in the prior art.
Figure 18:
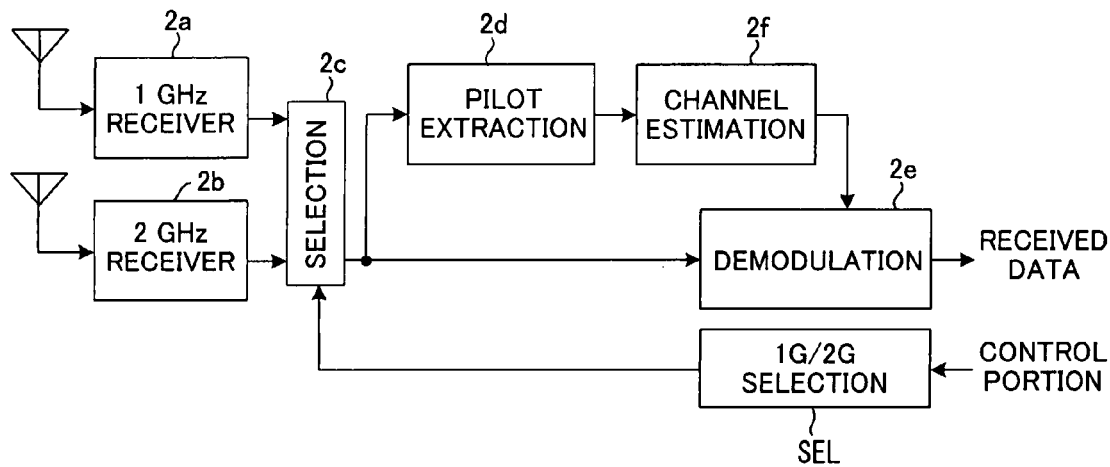
FIG. 18 shows the configuration of a reception apparatus when pilot lengths are held constant regardless of the frequency band in the prior art.
Figure 19:
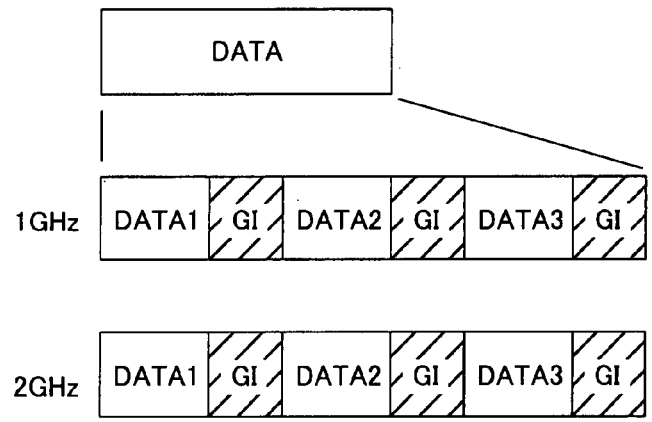
FIG. 19 explains an example of the prior art, in a case where guard interval lengths are held constant regardless of the frequency band.
Figure 20:
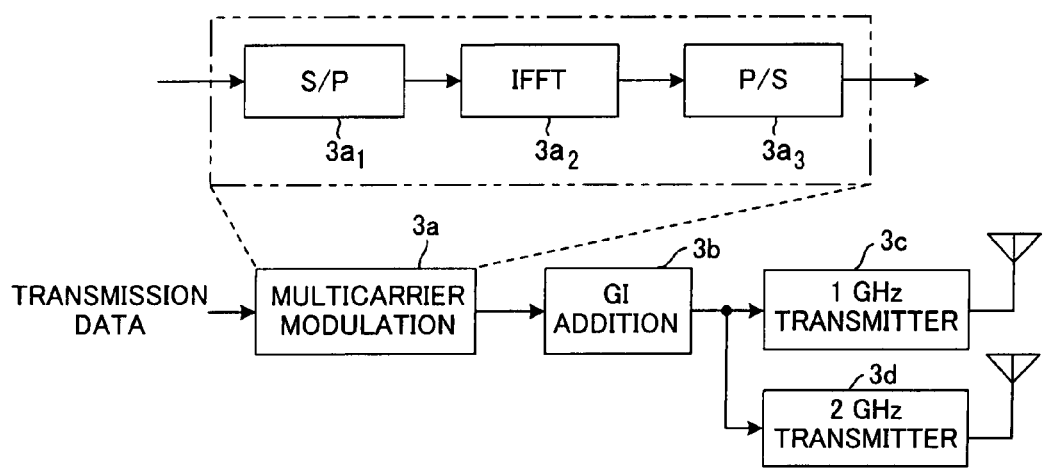
FIG. 20 shows the configuration of a transmission apparatus in a case where guard interval lengths are held constant regardless of the frequency band.
Figure 21:
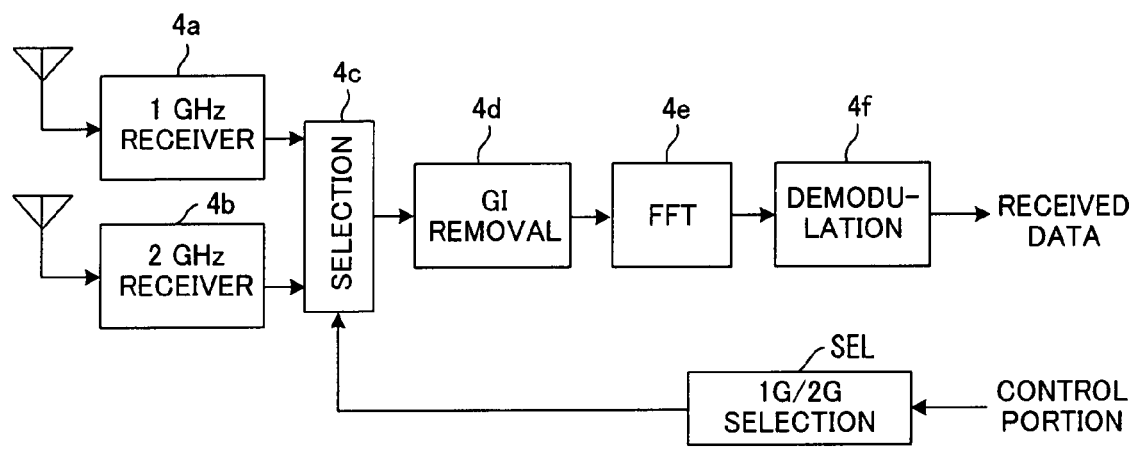
FIG. 21 shows the configuration of a reception apparatus in a case where guard interval lengths are held constant regardless of the frequency band; and, FIG. 22 explains the fact that the degree of degradation of orthogonality differs with the frequency.
Figure 22:
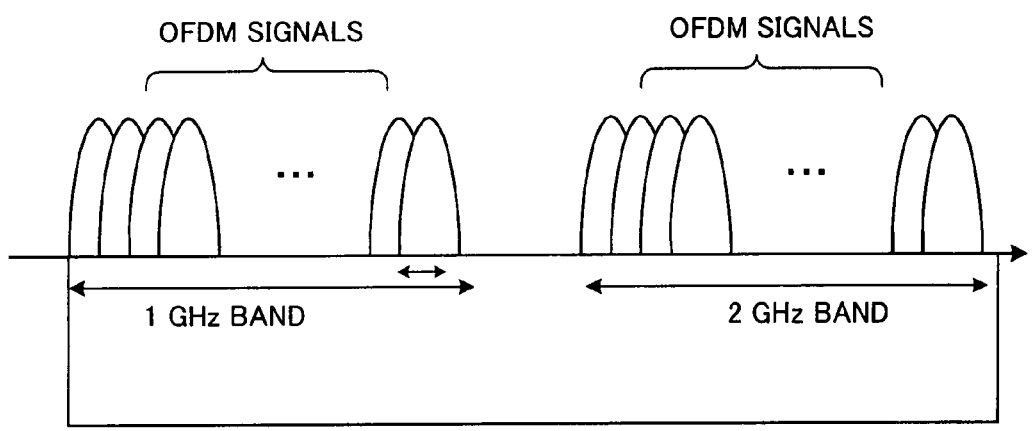

FIG. 13 shows the configuration of a transmission apparatus in third embodiment, in a radio communication system which performs OFDM transmission in each of a plurality of bands, in which the number of subcarriers is made different and the subcarrier interval is made different in each band; FIG. 14 shows the configuration of a reception apparatus.

The modulation portion 61 performs for example QPSK modulation of transmission data and outputs complex data. In the first multicarrier modulation portion 62, the serial/parallel conversion portion 62a converts the transmission data into N parallel data symbols, the IFFT portion 62b performs IFFT processing of the parallel data symbols as N subcarrier components, and a parallel/serial conversion portion, not shown, converts the N-symbol IFFT processing result (OFDM symbol) into serial data, which is output. The first guard interval addition portion 63 adds a guard interval of prescribed length to the N-symbols (OFDM symbol), and the 1 GHz transmitter 64 up-converts the frequency of the signals with guard intervals inserted to 1 GHz and transmits the signals from the antenna 65. The guard interval addition portion 63 inserts the guard intervals of length for use at 1 GHz for example.

In the second multicarrier modulation portion 66, the serial/parallel conversion portion 66a converts the transmission data into M parallel data symbols (M<N), the IFFT portion 66b performs IFFT processing of the parallel data symbols as M subcarrier components, and a parallel/serial conversion portion, not shown, converts the M-symbol IFFT processing result (OFDM symbols) into serial data, which is output. The second guard interval addition portion 67 adds a guard interval of prescribed length to the M-symbols (OFDM symbol), and the 2 GHz transmitter 68 up-converts the frequency of the signals with guard intervals inserted to 2 GHz and transmits the signals from the antenna 69. The guard interval addition portion 67 inserts the guard intervals of length for use at 2 GHz for example.

In the receiver, the 1 GHz receiver 71 down-converts the 1 GHz high-frequency received signals received by the antenna 70 to baseband signals and inputs the signals to the selection portion 74, and the 2 GHz receiver 73 down-converts the 2 GHz high-frequency received signals received by the antenna 72 to baseband signals and inputs the signals to the selection portion 74. The selection portion 74 selects the baseband signals output from the receiver indicated by a 1 GHz/2 GHz selection signal SEL output from a control portion, not shown, and inputs the signals to the guard interval removal portion 75. The guard interval removal portion 75 deletes guard intervals of prescribed length from the input signals, and inputs the result to the FFT portion 76. The FFT portion 76 performs N-point FFT processing when the 1 GHz/2 GHz selection signal SEL indicates 1 GHz, performs M-point FFT processing when 2 GHz is indicated, converts the FFT result to serial data, and inputs the data to the demodulation portion 77. The demodulation portion 77 demodulates the transmission data from the input signals.

By means of the above third embodiment, by making the number of carriers (N, M) in multicarrier transmission different or making the subcarrier intervals different in each band, the effect of frequency fluctuations in higher-frequency bands can be reduced and reception performance improved, and transmission efficiency can be enhanced.

In the above embodiments, one among the pilot length, guard interval length, or subcarrier intervals was changed in each band or at each frequency; but a configuration is possible in which two or more are changed simultaneously. That is, all of the combinations in which two among these three parameters are changed, or all combinations in which all three are changed, can be adopted.

What is claimed is:

1. A radio communication system, which simultaneously uses a plurality of different bands or a plurality of different radio frequencies to transmit signals, wherein a method for radio transmission is made different in each band of the plurality of different bands or at each radio frequency of the plurality of different radio frequencies by transmitting data using radio parameters which are different for each band or at each radio frequency and said radio parameters are made different by varying pilot lengths in each band or at each radio frequency.

2. A transmission apparatus in a radio communication system, in which a frequency band that is used for radio communication is separated into plural sub-bands including at least a first frequency sub-band and a second frequency sub-band which are kept away from each other in the frequency direction, comprising:
 a radio format setting portion that sets a first parameter which is concerned with a radio format in said first frequency sub-band in common and sets a second parameter which is concerned with the radio format in said second frequency sub-band in common; and
 a transmitter that transmits a radio signal in accordance with the radio format that is set by the radio format setting portion,
 wherein the first and second parameters are different from each other and said radio parameters are made different by varying pilot lengths in each sub-band.

3. A radio communication method used in a radio communication system, comprising:
 separating a frequency band which is used for radio communication, into plural sub-bands including at least a first frequency sub-band and a second frequency sub-band which are kept away from each other in the frequency direction;
 using a first parameter which is concerned with a radio format, in common to transmit a radio signal at said first frequency band; and
 using a second parameter which is concerned with the radio format, in common to transmit a radio signal at said second frequency band,
 wherein the first and second parameters are different from each other and said radio parameters are made different by varying pilot lengths in each sub-band.

* * * * *